United States Patent Office 3,350,379
Patented Oct. 31, 1967

3,350,379
BIS-TRIPHENYLPHOSPHINE CADMIUM HALIDE, ALUMINUM POWDER, MERCURIC DIHALIDE REACTION PRODUCT AND TRIALKYL ALUMINUM CATALYST FOR THE POLYMERIZATION OF BUTADIENE-1,3
Frank C. Cesare, Oakland, N.J., assignor to Uniroyal, Inc., a corporation of New Jersey
No Drawing. Filed Nov. 2, 1964, Ser. No. 408,393
12 Claims. (Cl. 260—94.3)

This invention relates to a catalyst for the polymerization of butadiene-1,3, hereinafter sometimes called butadiene, to a rubbery high molecular weight polybutadiene in which more than 80% of the monomer units have cis-1,4 structure, and to the polymerization of butadiene with such catalyst. The term high molecular weight polybutadiene refers to a polymer having a dilute solution viscosity of at least 0.1 in benzene which would correspond approximately to a number average molecular weight of at least 10,000.

The catalyst of the present invention is a mixture of bis-triphenylphosphine cadmium chloride complex

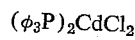

$(\phi_3P)_2CdCl_2$ aluminum powder, mercuric dihalide of the formula $HgX_2$ wherein X is chlorine or bromine, chlorine being preferred, and a trialkyl aluminum of the formula $R_3Al$ wherein R represents alkyl having 1 to 8 carbon atoms, e.g. methyl, ethyl, propyl, isobutyl, butyl, hexyl, octyl. The preferred trialkyl aluminum is triisobutyl aluminum.

The bis-triphenyl phosphine cadmium chloride complex may be prepared according to the procedure described in the literature by R. C. Evans, F. G. Mann, H. S. Peiser and D. Purdie, Journal of the Chemical Society (London), year 1940, page 1209. Bis-triphenylphosphine cadmium halide complexes are readily formed by shaking an aqueous or alcohol solution of the cadmium halide with the theoretical quantity of the triphenyl phosphine. The complex precipitates, giving almost 100% yield. The active catalyst mixture may be prepared by mixing the $(\phi_3P)_2CdCl_2$, aluminum powder and mercuric dichloride or dibromide in an aromatic solvent, e.g., benzene, xylene, toluene heating at a temperature of 75–90° C. for a period of 1 to 24 hours. The supernatant liquid is separated from the solid residue and there is then added the trialkyl aluminum. Longer heating time is not harmful. The mole ratio of aluminum powder to cadmium may be in the range of 20:1 to 1:1. The mole ratio of mercury to cadmium may be in the range of 20:1 to 1:1. The mole ratio of trialkyl aluminum to cadmium may be in the range of 0.005:1 to 5:1. The mole ratio of cadmium to aromatic solvent may be in the range of 0.00001:1 to 0.001:1. The polymerization may be carried out by adding the butadiene monomer directly to such a treated solution of the catalyst. The polymerization temperature is not critical and may be in the range of −20° C. to 100° C. The weight ratio of the butadiene to the aromatic solvent may be in the range of 1:20 to 1:1. The catalyst of the present invention is a soluble homogeneous catalyst system. It has the advantage over previous cis-polybutadiene catalysts in that no compound of a transition metal of variable valence is required. Transition metal compounds in the catalyst residues must be removed after polymerization, since they have a harmful oxidative effect on the polymer. The cadmium and aluminum and mercury compounds used in the catalysts of the present invention have no such harmful effect, and need not be removed.

The following examples illustrate the invention. All parts, percentages and ratios referred to herein, unless otherwise noted, are by weight.

Example 1

The bis-triphenylphosphine cadmium chloride complex was prepared by dissolving 13.1 g. (0.05 mole) of triphenylphosphine in 70 ml. of ethanol and then adding it to 4.6 g. of cadmium chloride dissolved in a mixture of 65 ml. ethanol and 12 ml. of water. Crystals of the complex form immediately. The crystals are separated and dried in a vacuum oven to give a 17.6 g. yield of the complex.

Nine grams of $HgCl_2$, 2 g. of aluminum powder and 5 g. of $(\phi_3P)_2CdCl_2$, which had been dried overnight, and 150 ml. of benzene were heated under reflux for 6 hours. 109.5 g. of the benzene solution above the solid residue was placed in a bottle of approximately 700 ml. capacity. To the bottle was added 0.5 ml. of a 16.6% benzene solution of triisobutyl aluminum, after which 32.5 g. of butadiene was introduced. After standing for 3 hours at room temperature, 2 g. of rubbery high molecular weight polybutadiene was obtained by coagulation with methanol. The structure of the polybutadiene as revealed by infrared analysis was 84.5% cis-1,4, 13.2% trans-1,4, and 2.3% vinyl (1,2) structure.

Example 2

A mixture of 150 ml. of benzene, 9 g. of $HgCl_2$, 5 g. of aluminum powder and 5 g. of $(\phi_3P)_2CdCl_2$ were heated under reflux for 3 hours after which 90 grams of the supernatant benzene solution were placed in a bottle of approximately 700 ml. capacity to which was added 2.5 ml. of a 16.6% benzene solution of triisobutyl aluminum, after which 17 g. of butadiene was introduced. After standing 24 hours at room temperature, 1 g. of rubbery high molecular weight polybutadiene was obtained on coagulation with methanol. The structure of the polybutadiene as revealed by infrared analysis was 82.1% cis-1,4, 15.5% trans-1,4, and 2.4% vinyl (1,2) structure.

Example 3

A mixture of 150 ml. of benzene, 9 g. of $HgCl_2$, 2 g. of aluminum powder, and 5 g. of $(\phi_3P)_2CdCl_2$ were heated under reflux for 1.5 hours after which 108.5 g. of the supernatant benzene solution were placed in a bottle of approximately 700 ml. capacity to which was added 2.0 ml. of a 16.6% benzene solution of triisobutyl aluminum, after which 30 g. of butadiene was introduced. After standing 24 hours at room temperature, ½ g. of rubbery high molecular weight polybutadiene was obtained on coagulation with methanol. The structure of the polybutadiene as revealed by infrared analysis was 93.4% cis-1,4, 3.9% trans-1,4, and 2.9% vinyl (1,2) structure.

In view of the many changes and modifications that may be made without departing from the principles underlying the invention, reference should be made to the appended claims for an understanding of the scope of the protection afforded the invention.

Having thus described my invention what I claim and desire to protect by Letters Patent is:

1. A polymerization catalyst comprising the reaction product of $(\phi_3P)_2CdCl_2$, aluminum powder, $HgX_2$ wherein X is selected from the group consisting of chlorine and bromine, and $R_3Al$ wherein R represents alkyl having 1 to 8 carbon atoms.

2. A polymerization catalyst comprising the reaction product of bis-triphenylphosphine cadmium chloride complex, aluminum powder, mercuric chloride and triisobutyl aluminum.

3. A polymerization catalyst comprising the reaction product of $(\phi_3P)_2CdCl_2$, aluminum powder, $HgX_2$ wherein X is selected from the group consisting of chlorine and bromine, and $R_3Al$ wherein R represents alkyl having 1 to 8 carbon atoms, the mole ratio of aluminum powder to cadmium being in the range of 20:1 to 1:1, the mole ratio of mercury to cadmium being in the range of 20:1 to 1:1, and the mole ratio of trialkyl aluminum to cadmium being in the range of 0.005:1 to 5:1.

4. A polymerization catalyst comprising the reaction product of bis-triphenylphosphine cadmium chloride complex, aluminum powder, mercuric chloride and triisobutyl aluminum, the mole ratio of aluminum powder to cadmium being in the range of 20:1 to 1:1, the mole ratio of mercury to cadmium being in the range of 20:1 to 1:1, and the mole ratio of triisobutyl aluminum to cadmium being in the range of 0.005:1 to 5:1.

5. A process of preparing a reaction medium for the polymerization of butadiene-1,3 when added thereto which comprises heating an aromatic solvent containing ($\phi$P)$_2$CdCl$_2$, aluminum powder, and HgX$_2$ wherein X is selected from the group consisting of chlorine and bromine at a temperature of 75–90° C. for 1 to 24 hours, and the adding R$_3$Al wherein R represents alkyl having 1 to 8 carbon atoms.

6. A process of preparing a reaction medium for the polymerization of butadiene-1,3 when added thereto which comprises heating benzene containing bis-triphenylphosphine cadmium chloride complex, aluminum powder, and mercuric chloride at a temperature of 75–90° C. for 1 to 24 hours, and then adding triisobutyl aluminum.

7. A process of preparing a reaction medium for the polymerization of butadiene-1,3 when added thereto which comprises heating an aromatic solvent containing ($\phi_3$P)$_2$CdCl$_2$, aluminum powder, and HgX$_2$ wherein X is selected from the group consisting of chlorine and bromine at a temperature of 75–90° C. for 1 to 24 hours, and then adding R$_3$Al wherein R represents alkyl having 1 to 8 carbon atoms, the mole ratio of aluminum powder to cadmium being in the range of 20:1 to 1:1, the mole ratio fo mercury to cadmium being in the range of 20:1 to 1:1, and the mole ratio of trialkyl aluminum to cadmium being in the range of 0.005:1 to 5:1, and the mole ratio of the cadmium to aromatic solvent being in the range of 0.00001:1 to 0.001:1.

8. A process of preparing a reaction medium for the polymerization of butadiene-1,3 when added thereto which comprises heating benzene containing bis-triphenylphosphine cadmium chloride complex, aluminum powder and mercuric chloride at a temperature of 75–90° C. for 1 to 24 hours, and then adding triisobutyl aluminum, the mole ratio of aluminum powder to cadmium being in the range of 20:1 to 1:1, the mole ratio of mercury to cadmium being in the range of 20:1 to 1:1, and the mole ratio of triisobutyl aluminum to cadmium being in the range of 0.005:1 to 5:1, and the mole ratio of cadmium to benzene being in the range of 0.00001:1 to 0.001:1.

9. A process for producing a rubbery polymer of butadiene-1,3 which comprises contacting butadiene-1,3 with an aromatic solvent and the catalyst of claim 1.

10. A process for producing a rubbery polymer of butadiene-1,3 which comprises contacting butadiene-1,3 with benzene and the catalyst of claim 2.

11. A process for producing a rubbery polymer of butadiene-1,3 which comprises contacting butadiene-1,3 with an aromatic solvent and the catalyst of claim 3, and the mole ratio of cadmium to aromatic solvent being in the range of 0.00001:1 to 0.001:1.

12. A process for producing a rubbery polymer of butadiene-1,3 which comprises contacting butadiene-1,3 with benzene and the catalyst of claim 4, and the mole ratio of cadmium to benzene being in the range of 0.00001:1 to 0.001:1.

References Cited

UNITED STATES PATENTS

| 3,228,917 | 1/1966 | Childers | 260—94.3 |
| 3,228,924 | 1/1966 | Childers | 260—94.3 |
| 3,230,209 | 1/1966 | Cesare | 260—94.3 |

OTHER REFERENCES

Mann et al., J. Chem. Soc. (London) (1940) pp. 1230–1235.

JOSEPH L. SCHOFER, Primary Examiner.

M. B. KURTZMAN, Assistant Examiner.